(12) United States Patent
Mallikarjunan et al.

(10) Patent No.: US 9,648,492 B2
(45) Date of Patent: May 9, 2017

(54) LOCATION-BASED UPDATE OF SUBSCRIBER IDENTITY INFORMATION IN A WIRELESS DEVICE

(71) Applicant: Apple Inc., Cupertino, CA (US)

(72) Inventors: Raghuveer Mallikarjunan, Sunnyvale, CA (US); Wael S Barakat, San Jose, CA (US)

(73) Assignee: Apple Inc., Cupertino, CA (US)

( * ) Notice: Subject to any disclaimer, the term of this patent is extended or adjusted under 35 U.S.C. 154(b) by 524 days.

(21) Appl. No.: 13/648,343

(22) Filed: Oct. 10, 2012

(65) Prior Publication Data
US 2014/0099916 A1    Apr. 10, 2014

(51) Int. Cl.
| | |
|---|---|
| *H04W 4/02* | (2009.01) |
| *H04W 8/20* | (2009.01) |
| *H04M 15/00* | (2006.01) |
| *H04M 17/00* | (2006.01) |
| *H04W 4/24* | (2009.01) |

(52) U.S. Cl.
CPC ............. *H04W 8/20* (2013.01); *H04M 15/43* (2013.01); *H04M 15/80* (2013.01); *H04M 15/8033* (2013.01); *H04M 17/10* (2013.01); *H04M 17/103* (2013.01); *H04W 4/24* (2013.01); *H04M 2017/22* (2013.01)

(58) Field of Classification Search
CPC ..... H04W 48/18; H04W 88/06; H04W 36/14; H04W 36/32; H04W 4/02; H04W 8/08; H04W 48/04; H04W 60/00; H04W 64/00; H04L 29/08657; H04L 29/08108

USPC ............. 455/456.1–456.6, 435.2, 432.1, 457
See application file for complete search history.

(56) References Cited

U.S. PATENT DOCUMENTS

| | | | |
|---|---|---|---|
| 6,119,000 A | 9/2000 | Stephenson et al. | |
| 2008/0096559 A1* | 4/2008 | Phillips et al. | ............ 455/435.2 |
| 2010/0136967 A1 | 6/2010 | Du et al. | |
| 2012/0309374 A1* | 12/2012 | Tagg et al. | .................... 455/418 |
| 2013/0102248 A1* | 4/2013 | Jay | .......................... H04L 67/02 |
| | | | 455/41.1 |
| 2013/0165075 A1* | 6/2013 | Rishy-Maharaj | ..... H04W 12/04 |
| | | | 455/411 |
| 2013/0281085 A1* | 10/2013 | Sen et al. | .................... 455/426.1 |
| 2014/0038601 A1* | 2/2014 | Gouriou et al. | ........... 455/435.1 |

FOREIGN PATENT DOCUMENTS

WO    2012076181 A1    6/2012

* cited by examiner

*Primary Examiner* — Temica M Beamer
*Assistant Examiner* — Dung Lam
(74) *Attorney, Agent, or Firm* — Meyertons Hood Kivlin Kowert & Goetzel, P.C.; Jeffrey C. Hood (57) ABSTRACT

Location-based subscriber identity update in a wireless user equipment (UE) device. A location of the UE may be determined. An indication of a plurality of network connectivity options may be provided via a user interface. The plurality of network connectivity options may be provided based on the location of the UE. User input selecting a network connectivity option may be received via the user interface. The UE may be configured according to the selected network connectivity option in response to the user input.

25 Claims, 5 Drawing Sheets

FIG. 7

LOCATION-BASED UPDATE OF SUBSCRIBER IDENTITY INFORMATION IN A WIRELESS DEVICE

FIELD

The present embodiments relate to the field of wireless communication, and more particularly to a system and method for performing location-based updating of subscriber identity information in a user equipment (UE) device which utilizes an embedded subscriber identity module (eSIM).

DESCRIPTION OF THE RELATED ART

Wireless communication systems are rapidly growing in usage. Further, wireless communication technology has evolved from voice-only communications to also include the transmission of data, such as Internet and multimedia content. In order to enable their wireless device to access a wireless communication network (e.g., a cellular telecommunication network) which provides such services, a user may in some cases be required to subscribe to a service provider (a "carrier"), who in turn may provide such services to the user, e.g., via a wireless communication network which they operate.

Such subscribers in a wireless communication network are typically assigned subscriber identity information, which may for example be stored as part of a subscriber identity module (SIM) in the subscriber's wireless device. For example, a commonly used type of subscriber identity information is an International Mobile Subscriber Identity (IMSI), which identifies a subscriber's wireless device in their carrier's network. For subscribers to roam outside of their home network, their carrier may negotiate roaming agreements with other network operators so the visited network recognizes the subscriber's identity and allows roaming to proceed. Negotiating and administering these agreements can be time consuming, and there may be a limit on how many roaming agreements a carrier may choose to support. As a result, emerging or smaller carriers can have difficulty offering extensive roaming coverage.

It is also possible for a user to carry two (or more) identities on a SIM in their wireless device. For example, one may be provided by a home carrier and another may be provided by a roaming broker who has roaming agreements with international operators. Switching from one identity to the other may be either user triggered or automatically selected.

However, if a user arrives at a location at which their carrier does not provide service and has not negotiated a roaming agreement with a local network operator (regardless of how many subscriber identities may be stored on their wireless device), the user may not be able to utilize at least some of the wireless communication capabilities of their wireless device. Furthermore, even if the user's home carrier has negotiated roaming agreements in a location, it may not be desirable (e.g., because of additional costs) to a user to automatically continue to use their current subscriber identity in that location. Accordingly, improvements in wireless communications would be desirable.

SUMMARY

In light of the foregoing and other concerns, improved techniques for location-based updating of subscriber identity information in a wireless user equipment (UE) device would be desirable. For example, it might be desirable for the UE to detect its location, provide certain (e.g., location-specific) subscriber identity related options to a user, receive user input selecting an option (and possibly further user input specifying further details of the selected option), and implement the selected option. Such a process would enable the user to select their preferred subscriber identity choice based on their current location.

Embodiments of the disclosure may thus be directed to such a method, to a UE device configured to implement such a method, and/or to a non-transitory computer accessible memory medium storing program instructions executable by a processor to implement such a method. The UE device may include one or more antennas for performing wireless communication. The UE device may also include a processing element configured to implement part or all of the method (e.g., by executing program instructions). In addition, the UE device may include a non-transitory computer accessible memory medium, which may store program instructions executable by the UE.

The actual technique(s) used by the UE to detect its location, the options provided (and any techniques for selecting which options to provide), and the means of implementing those options may include any of a variety of techniques, such as those described in further detail subsequently herein.

As one example, the UE may be configured to detect its location using one or more types of wireless communication. For example, the UE may receive information from one or more cellular towers (cellular base stations), via a global navigational satellite system (GNSS) such as the global positioning system (GPS), and/or via a Wi-Fi (IEEE 802.11) connection.

Depending on the location, then, the UE may present one or more options to a user (for example, if the UE is in a location without service from a carrier corresponding to a current subscriber identity of the UE), or may automatically perform one or more actions (for example, continuing to use the current subscriber identity if the UE is in a location with service from a carrier corresponding to a current subscriber identity of the UE, or automatically switching to a second subscriber identity if the UE is in a location with service from a carrier corresponding to the second subscriber identity of the UE and the UE has been previously configured to do so).

In some scenarios, it may particularly be desirable to present the user with an option for purchasing/provisioning a subscriber identity module (SIM), for example an embedded SIM (eSIM), with a new subscriber identity which is local to the detected location, e.g., if the UE is in a location without local service from a carrier corresponding to a current subscriber identity of the UE.

In case such an option is selected, the UE may store (or obtain, e.g., via specially permitted communication using a network of a local carrier) a list of carriers and/or service plans for the UE's current location (and possibly other locations). The UE may thus be able to provide a list (or other indication) of such carriers and/or plans to the user, in order to provide the user with options for local subscriber identities. Once a carrier/plan has been selected, the UE may obtain (e.g, again via specially permitted communication using a network of a local carrier) subscriber identity information according to the selected carrier/plan and configure itself accordingly. Once the UE has been configured with the newly obtained subscriber identity, the UE may register with the network corresponding to its newly obtained subscriber identity and obtain cellular service according to selected service plan.

Note that in order to obtain the local subscriber identity, it may be necessary for the user to purchase the selected service plan. Accordingly, the UE may also be configured to provide payment information. This may also be performed in any of a variety of ways. For example, as one possibility, the UE may receive user input with credit card or other payment information, and provide that information to an appropriate party via the specially permitted cellular communication. As another possibility, the UE may store credit card or other payment information and automatically provide this information based on a user's selection to purchase the service plan. As a still further possibility, the UE may enable the user to pay via a third party (e.g., via an account with the third party). It is also possible that no payment may be required initially, for example if payment may instead be provided at another time and/or in another manner.

Note that it may also be desirable to present a user whose current subscriber identity is not local to the user's current location with an option to switch to a second subscriber identity (which may or may not be local to the UE's current location) stored in a SIM of the UE, to continue using their current subscriber identity (e.g., to roam, if such agreements are in place with one or more local carriers), and/or to turn off their cellular radio (e.g., to operate in an "airplane mode"). It may further be desirable for the UE to determine and indicate to the user whether the current subscriber identity and/or any other (e.g., currently inactive) subscriber identities on the UE would be able to obtain local service, would be able to obtain service via roaming agreements, or would not be able to obtain service in the UE's current location.

Thus, by detecting the UE's location and updating and/or providing options for updating the UE's subscriber identity information based on the UE's location, a user of the UE may be provided with greater flexibility and control over their UE. Furthermore, by providing the user with options for obtaining a new subscriber identity and/or switching subscriber identities based on the UE's location, the user may more conveniently obtain cellular service in a wider range of locations and/or at a lower cost than would otherwise be possible. This may be particularly true in relation to a UE which implements a removable/non-configurable SIM, for which the user may be required to find and go to a physical store in order to obtain a new subscriber identity in their new location.

BRIEF DESCRIPTION OF THE DRAWINGS

A better understanding of the present subject matter can be obtained when the following detailed description of the preferred embodiment is considered in conjunction with the following drawings, in which.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

The following acronyms are used in this disclosure.
3GPP: Third Generation Partnership Project
3GPP2: Third Generation Partnership Project 2
GSM: Global System for Mobile Communications
UMTS: Universal Mobile Telecommunications System
LTE: Long Term Evolution
LTE-A: LTE-Advanced
SIM: Subscriber Identity Module
eSIM: Embedded SIM
IMSI: International Mobile Subscriber Identity
MCC: Mobile Country Code
MNC: Mobile Network Code Terms The following is a glossary of terms used in this disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 1:
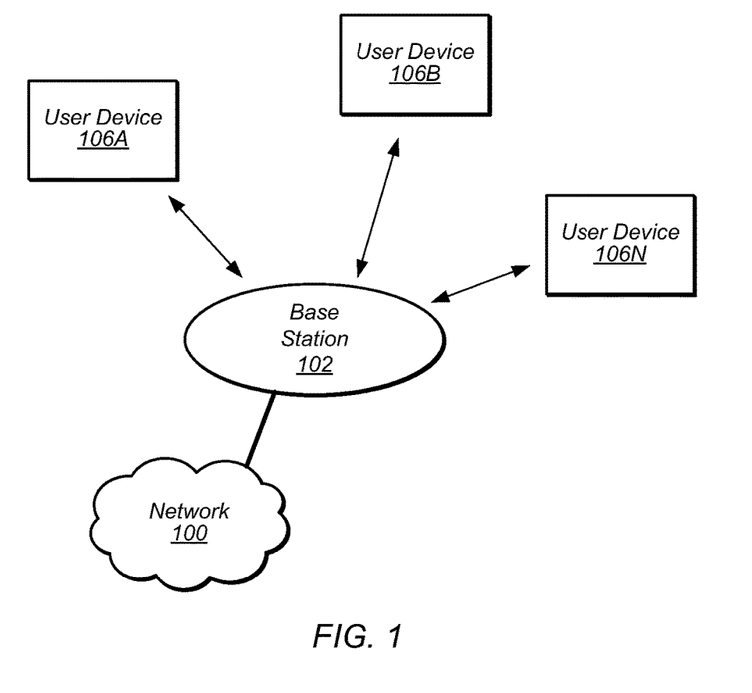
FIG. 1 illustrates an exemplary wireless communication system.
Figure 2:
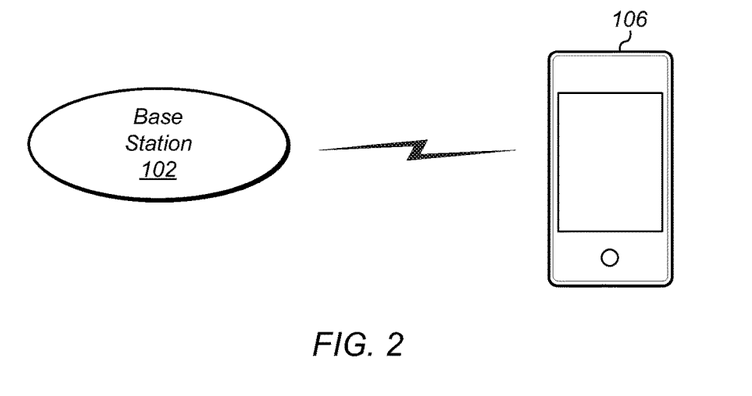
FIG. 2 illustrates an exemplary base station in communication with an exemplary user equipment device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106A, 106B, etc., through 106N. Each of the user devices may be referred to herein as a "user equipment" (UE). Thus, the user devices are referred to as UEs or UE devices.

The base station 102 may be a base transceiver station (BTS) or cell site, and comprises hardware that enables wireless communication with the user devices 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). Thus in some embodiments, the UE 106 might be configured to communicate with base station 102 according to a first cellular communication standard (e.g., LTE) and might also be configured to communicate with other base stations according to a second cellular communication standard (e.g., one or more CDMA2000 cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates user equipment 106 (e.g., one of the devices 106A through 106N) in communication with the base station 102. The UE 106 may be a device with wireless network connectivity such as a mobile phone, a hand-held device, a computer or a tablet, or virtually any type of wireless device.

The UE may include a processor that is configured to execute program instructions stored in memory. The UE may perform any of the method embodiments described herein by executing such stored instructions. Alternatively, or in addition, the UE may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1xRTT/1xEV-DO/HRPD/eHRPD) or LTE using a single shared radio. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or CDMA2000 1xRTT, and separate radios for communicating using each of Wi-Fi and Bluetooth. Other configurations are also possible.

Figure 3:
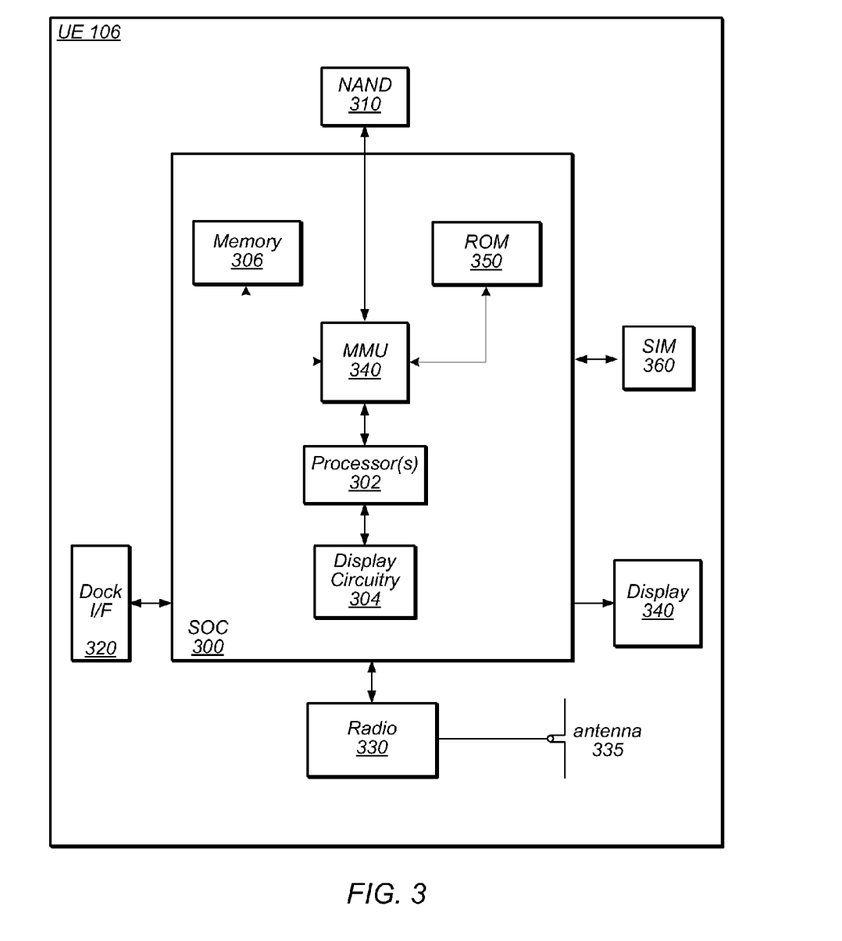
FIG. 3 illustrates an exemplary block diagram of a user equipment device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 340. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 340. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 340, and wireless communication circuitry 330 (e.g., for LTE, LTE-A, CDMA2000, Bluetooth, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

The UE 106 may also include one or more user interface elements. The user interface elements may include any of various elements, such as display 340 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As shown, the UE 106 may also include a SIM (Subscriber Identity Module) 360. The SIM 360 may be implemented as an application on a smart card, in some embodiments. The smart card may itself be referred to as a SIM card in some cases. As one example, the SIM 360 may be an application which executes on a Universal Integrated Circuit Card (UICC). The smart card may also include (e.g., store and/or execute) one or more other applications, if desired. The smart card may be removable.

Alternatively, the SIM 360 may be implemented as an embedded SIM (eSIM). In this case, the SIM 360 may be implemented in device hardware and/or software. For example, in some embodiments, the UE 106 may include an embedded UICC (eUICC), e.g., a device which is built into the UE 106 and is not removable. The eUICC may be programmable, such that an eSIM may be implemented on the eUICC. In other embodiments, the eSIM may be installed in UE 106 software, e.g., as program instructions stored on a memory medium (such as memory 306 or NAND 310) executing on a processor (such as processor 302) in the UE 106.

The SIM 360 may include a number of types of information, including personalized information specific to a user and/or device (e.g., personalized information), and information that is not specific to a user and/or device (e.g., common information). The common portion may include files, data structures, and/or applications that may be common among some or all types of SIMs (e.g., among UICCs/eUICCs of the same profile). The personalized information may include user/unit specific data, for example information identifying the user/unit to their carrier's network, personalized authorization and/or security information, etc. Some or all of the personalized information may be used as a subscriber identity for the UE 106, for example in order to identify the UE 106 to a carrier's network and to obtain cellular service from the carrier.

As one example, the personalized information may include one or more International Mobile Subscriber Identity (IMSI) numbers. An IMSI may identify the subscriber to their carrier's network. The IMSI may, for example, be a number including the subscriber's "home" mobile country code (MCC) and mobile network code (MNC), as well as a Mobile Subscription Identification Number (MSIN) which is unique to the subscriber. The personalized information may also or alternatively include a personal identification number (PIN) (e.g., a code which the user may use to access their SIM), a personal unblocking code and/or personal unblocking key (PUC/PUK), and one or more authentication keys (K/Ki). Any of a variety of other personalized information may also or alternatively be used, as desired.

As noted above, the subscriber identity information may be used to identify the UE 106 to its subscriber's carrier cellular network. The subscriber identity may also be used outside of the "home" area in which the subscriber's carrier provides cellular service in some situations, for example if the subscriber's carrier has arranged any roaming agreements with other network operators so that the visited network will recognize the subscriber identity information and allow access to the network.

Note that the area in which a subscriber identity may be used to obtain cellular service via the carrier with which the subscriber identity is associated may be considered a "local service area" for the subscriber identity, in which locations the subscriber identity may be considered "local". In other words, as used herein, a UE 106 may be considered able to obtain "local service" in a location using a subscriber identity if the carrier associated with (e.g., which provided) the subscriber identity provides cellular service in that location.

Any areas in which the subscriber identity may be used to obtain cellular service via another carrier than that with which the subscriber identity is associated (e.g., via one or more roaming agreements) may be considered a "roaming service area" for the subscriber identity. In other words, as used herein, a UE 106 may be considered able to obtain "roaming service" in a location using a subscriber identity if carrier with which a roaming agreement has been negotiated by the carrier associated with the subscriber identity provides cellular service in that location.

Any areas in which the subscriber identity may not be used to obtain cellular service via the carrier with which the subscriber identity is associated or any other may be considered a "no service area" for the subscriber identity. In other words, as used herein, a UE 106 may be considered able to obtain "no service" in a location using a subscriber identity if neither the carrier associated with the subscriber identity nor any other carrier with which a roaming agreement has been negotiated by the carrier associated with the subscriber identity provides cellular service in that location. Note that cellular service may still be available (for example using a different subscriber identity associated with a local carrier) in locations for which no service is available using a particular subscriber identity, though it is also possible that no cellular service may be available at all in some (e.g., remote) locations.

If a user takes the UE 106 to a location outside of the "home" area, it may be desirable to update and/or provide options for updating the subscriber identity information for the UE 106, since the subscriber's carrier may not be able to provide local (or possibly even roaming) service at that location. Accordingly, as described further subsequently herein, the UE 106 may include hardware and software components for implementing a method for location-based updating of subscriber identity information.

The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit).

Figure 4:
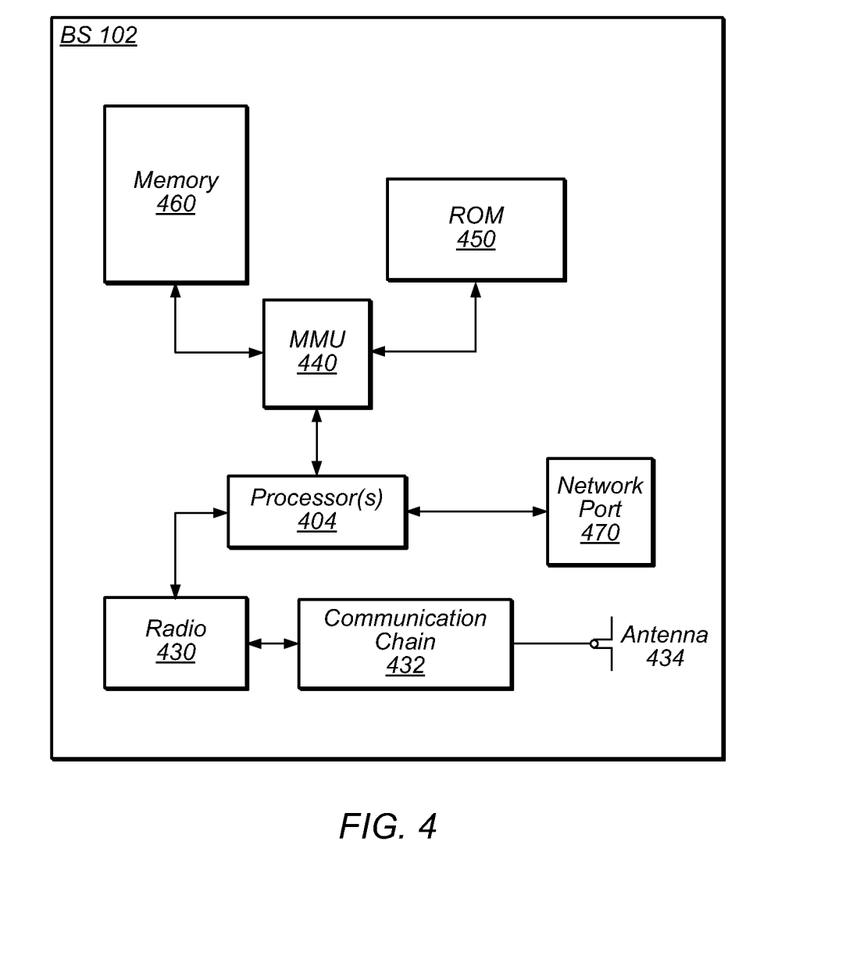
FIG. 4 illustrates an exemplary block diagram of a base station.

FIG. 4—Exemplary Block Diagram of a Base Station

FIG. 4 illustrates an exemplary block diagram of a base station 102. It is noted that the base station of FIG. 4 is merely one example of a possible base station. As shown, the base station 102 may include processor(s) 404 which may execute program instructions for the base station 102. The processor(s) 102 may also be coupled to memory management unit (MMU) 440, which may be configured to receive addresses from the processor(s) 102 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
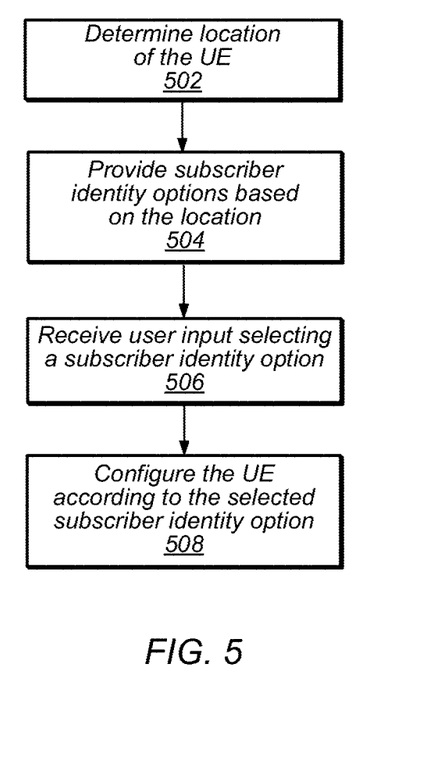
FIG. 5 is a flowchart diagram illustrating an exemplary method for location-based subscriber identity updating in a user equipment device.

FIG. 5—Flowchart

As previously noted, it may be desirable for a UE to update and/or provide options for a user to update their subscriber identity information based on the location of the UE, particularly if the UE enters a location at which local cellular service (or possibly any cellular service) is unavailable using the UE's active subscriber identity. FIG. 5 is a flowchart diagram illustrating a method for location-based updating of subscriber identity information in a user equipment (UE) device.

The method shown in FIG. 5 may be used in conjunction with any of the systems or devices shown in the above Figures, among other devices. In various embodiments, some of the method elements shown may be performed concurrently, in a different order than shown, or may be omitted. Note also that additional method elements may also be performed as desired.

In 502, a location of the UE may be determined. The location may be determined at a granularity usable for determining appropriate/available network connectivity (e.g., subscriber identity) options. For example, it may in some cases be sufficient for the UE to determine a country in which the UE is located. Alternatively, location may be determined with more (e.g., state/province/county/geospatial coordinates/etc), less (e.g., continent/block of countries/etc), or otherwise different (e.g., cultural or language-based regions spanning national boundaries) precision than country-based determination of location.

The location may be determined using one or more wireless communication technologies, or in any of a variety of ways. As one example, the UE might determine its location via cellular communication with one or more base stations (e.g., cellular towers). The UE could, for example, receive system information indicating mobile country code (MCC) and mobile network code (MNC) from a base station, and broadly determine its location in that manner. Alternatively, or in addition, the UE could more precisely determine its location by triangulating its position relative to multiple base stations from which the UE can receive signals.

As another example, the location may be determined from a WLAN access point (AP) which provides a Wi-Fi network. For example, an AP might broadcast location information (e.g., in a beacon), which the UE may be able to receive without actually joining the Wi-Fi network. Alternatively, the UE may join the Wi-Fi network provided by the access point and acquire the location information via the Wi-Fi network, or a broader network to which the Wi-Fi network is connected (e.g., the Internet). It is possible that the AP may be configured to provide location information which is specifically configured for use by UEs in selecting subscriber identities. For example, airport APs (or train station APs, or other transit-locale-oriented APs) may provide MCC and/or MNC information for the location in which the AP is located; alternatively, or in addition, city, state, province, or other location-related information may be provided.

As a still further example, the location may be determined using a global navigational satellite (GNS) system. For example, the UE device may be configured with a global positioning system (GPS) and/or GLONASS module, from which the UE device may be able to determine geospatial coordinates or other location information.

Other ways of automatically determining the location of the UE are also possible. For example, the UE may be configured to determine its location via information (e.g., station identification information or other configuration information) received from a mobile television broadcaster, e.g., according to a mobile television broadcast standard (e.g., DVB-H, ATSC-M/H, etc.).

It is also possible that the location may be determined based on user input. For example, if a user is travelling to a location (e.g., a foreign country) in which their carrier does not provide local service (or for any other reason), the user might indicate to the UE (e.g., via a user interface, which may include any of various user interface elements such as described above with respect to FIG. 3) to which location (e.g., country) they are travelling (or have travelled to, if they have already arrived, or will travel to, if they have not yet arrived). The UE may then be able to determine various subscriber identity options which may be possible/appropriate for the determined location.

In 504, network connectivity options, some or all of which may relate to the subscriber identity of the UE (and may thus alternatively be referred to as "subscriber identity options"), may be provided. An indication of the possible network connectivity options may be provided via a user interface. For example, a list of network connectivity options could be displayed on a display of the UE, and/or recited on one or more speakers of the UE, among other possible options. Note that the indication of the network connectivity options may be provided based on the determined location, and possibly also based on a currently active subscriber identity of the UE. It is possible, for example, that the currently active subscriber identity of the UE may correspond to a carrier which does not provide local service in the location at which the UE has been determined to be located. Thus, the UE may provide the indication of possible network connectivity options in response to determining that local service is not available using the currently active subscriber identity.

Further, the particular network connectivity options provided may also be determined based on the location of the UE. For example, the active subscriber identity may be used to obtain roaming service in some locations but not in others, or the UE might be configured with an alternate (e.g., currently inactive but stored on the UE) subscriber identity which may be used to obtain local or roaming service in some locations. Thus, the UE may indicate to the user (via the user interface) network connectivity options which are specific to the determined location and which may also be specific to the configuration of the UE.

Note that the UE may be configured to determine whether local, roaming, or no service would be available using the active subscriber identity and any existing alternate subscriber identities in any of a variety of ways. For example, the UE might compare a mobile country code (MCC) associated with the country in which the UE is located with an MCC associated with the active subscriber identity and any existing alternate subscriber identities, or might scan for nearby base stations and determine with which carriers they are associated, or might determine whether the active subscriber identity and any existing alternate subscriber identities would provide local, roaming, or no service by any of a variety of other means.

Note that "local service", "roaming service", and "no service" may be considered available in a particular location based on actual conditions present in the immediate vicinity of the UE (e.g., because compatible base stations with adequate signal strength/quality are or are not available in the UE's immediate vicinity), or may be considered available in a particular location based on expectation of service availability within a larger region in which the UE is located. For example, if desired, a carrier which is known to operate a network in a country may be considered to provide local service in that country even if a user is in a remote portion of a country where no service is available from that carrier in the immediate vicinity, based on the expectation that the carrier will provide local service elsewhere in the country. Alternatively, if desired, that carrier could be considered to provide no service in that particular location, reflecting that actual conditions present in the immediate location of the UE. Determination of services provided by carriers may be performed at the same granularity at which location of the UE is determined (e.g., based on country, region, or other granularity level) for convenience, or at different granularities if desired.

As one possible subscriber identity option, the active subscriber identity (a "first" subscriber identity) may continue to be used as the active subscriber identity. As noted above, it may be that local service is not available using the first subscriber identity; for example, this may be a trigger for providing the indication of the possible subscriber identity options. However, it may still be a possible option to continue to use the first subscriber identity as the active subscriber identity, for example, if roaming service (e.g., via one or more roaming agreements between a carrier corresponding to the first subscriber identity and one or more carriers which provide local service in the location) is available using the first subscriber identity.

Certainly, this may also be a possible subscriber identity option if local service is available using the first subscriber identity. However, at least in some cases, if local service is available using the first subscriber identity, the UE may be configured to simply continue using the first subscriber identity as the active subscriber identity without providing an indication of possible subscriber identity options to the user via the user interface.

Similarly, if no service is available using the first subscriber identity, an option may still be provided to continue using the first subscriber identity as the active subscriber identity. For example, if the user expects to be in a location without service available using the first subscriber identity for only a short period of time before returning to a location with (local or roaming) service available using the first subscriber identity, the user might prefer to continue using the first subscriber identity as the active subscriber identity.

As another possible subscriber identity option, an alternate subscriber identity (a "second" subscriber identity) may be activated, and the UE may operate with the second subscriber identity as the active subscriber identity. The second subscriber identity may be stored on the UE (e.g., in a SIM or eSIM of the UE), but may currently be inactive. For example, the SIM may store multiple subscriber identities (e.g., multiple IMSIs, may be a multi-IMSI SIM), though the UE may only be able to operate with one active subscriber identity at a time.

It may be the case that local service is available using the second subscriber identity. For example, the second subscriber identity may correspond to a carrier which provides local service in the determined location. This may be the case if the user travels frequently between two locations and has a different carrier/subscriber identity for each location, among other possible scenarios. In this case, it may be desirable to present the user with the option of reconfiguring the UE such that the second subscriber identity is the active subscriber identity in the location in which local service is available using the second subscriber identity.

Alternatively, it may be the case that roaming service is available using the second subscriber identity. For example, the second subscriber identity may correspond to a roaming broker which has negotiated a roaming agreement with at least one local service provider in the determined location. This may be another common scenario for a user who travels frequently between certain locations, among other possible scenarios. In this case, it may also be desirable to present the user with the option of reconfiguring the UE such that the second subscriber identity is the active subscriber identity in the location in which roaming service is available using the second subscriber identity.

If desired, the UE may also present an option to use the second subscriber identity even if no service is available using the second subscriber identity. However, in order to provide more relevant options to the user, it may be desirable to not present activating the second subscriber identity as an option if no service is available in the determined location using the second subscriber identity.

Note that if the UE includes further alternate subscriber identities, subscriber identity options may also be provided for activating one or more such further alternate subscriber identities (e.g., if local or roaming service may be available using any of the further alternate subscriber identities). Alternatively, or in addition, it may be determined not to present an option to activate such further alternate subscriber identities, e.g., if it is determined that no local or roaming service would thereby be available to the UE.

As a further possible network connectivity option, the cellular radio may be powered off or into a low-power and/or non-communicative mode, such as an "airplane mode". Note that the term "airplane mode" may be used in multiple possible ways, but generally may include a mode of operation in which any cellular radios of the UE are configured to not operate. For some UEs, operating in an airplane mode may include powering off all radios (e.g., cellular radios and radios used for other wireless technologies). For other UEs, cellular radios may be powered off in airplane mode, but other (e.g., shorter range) wireless technologies (such as Wi-Fi, Bluetooth, Near Field Communication (NFC), etc.) may be enabled. Alternatively (or in addition), the first subscriber identity may be deactivated without activating an alternate subscriber identity. In this case the UE may operate without an active subscriber identity. One or more of these options may be desirable, for example, if the user is not planning on using cellular service in the determined location (e.g., due to expense, battery considerations, external (e.g., legal, etiquette, etc) restrictions, personal preference, or for any of a variety of other reasons).

Another subscriber identity option could include obtaining a new subscriber identity (a "third" subscriber identity). In particular, it may be possible for the third subscriber identity to be obtained (e.g., purchased) via wireless communication. For example, the third subscriber identity could be purchased and obtained via cellular communication. Local service, or at least roaming service, may be available in the location using the new subscriber identity; for example, the new subscriber identity may correspond to a local carrier (or possibly to a roaming broker with roaming service agreements with one or more local carriers). This might be a desirable option for the user if no service (or only roaming service) is available using any subscriber identities already present on the UE, and the user wishes to obtain local (or even just roaming) service in their current location.

In 506, user input selecting a network connectivity option may be received. The user input may be received via the user interface. For example, the user may push a button or touch a portion of a touch-screen corresponding to a displayed option, may speak or otherwise provide an audible input to a microphone of the UE, and/or provide another form of user input which the UE may be configured to interpret as selecting a network connectivity option from those provided.

Note that it may also be possible to receive user input corresponding to a network connectivity option of which an indication was not provided, or requesting further network connectivity options. For example, some network connectivity options may not be initially presented (e.g., if determined to be unlikely to be relevant, such as if no service would be available using the desired network connectivity option). Such network connectivity options may nonetheless be viable options according to which the UE may be configured, at least in some cases.

In 508, the UE may be configured according to the selected network connectivity option. Configuring the UE according to the selected network connectivity option may depend on the option selected. For example, if the selected network connectivity option is to continue using the currently active subscriber identity, no further action may be required. The UE may then, if permitted to, register (e.g., via cellular communication with a base station) with a local service provider (e.g., the service provider corresponding to the active subscriber identity, or a service provider with which the service provider corresponding to the active subscriber identity has negotiated a roaming agreement), and thereby obtain cellular service at its location.

Any of a variety of steps may be performed in order to register with the local service provider. For example, the UE may scan frequencies (e.g., channels) within a certain operating range for networks. Upon discovering a network, the UE device may identify itself to the network (e.g., using the selected subscriber identity) and negotiate for service. Once the network has determined that the subscriber identity is authorized to use the network (which may be determined at least in part based on the active subscriber identity of the UE), the UE may be registered and may be given full (or partial, e.g., depending on the roaming agreement) communication (e.g., voice and/or data) capability with the network. Other steps may alternatively or additionally be performed in registering the UE with the network, depending on the implementation, as will be apparent to those skilled in the art in light of this disclosure.

If the selected network connectivity option is to activate an alternate subscriber identity already stored on the UE (e.g., on a SIM or eSIM of the UE), configuring the UE may include activating the alternate subscriber identity. This may include sending a command (e.g., an envelope command) to the SIM (e.g., to perform a SIM refresh and/or to load the alternate subscriber identity (e.g., potentially including carrier bundle, IMSI, preferred roaming list, SID, NID, etc.) into main memory of the SIM). Once the alternate subscriber identity has been activated (e.g., has become the active subscriber identity), the UE may, if permitted to, register (e.g., via cellular communication with a base station) with a local service provider (e.g., the service provider corresponding to the active subscriber identity, or a service provider with which the service provider corresponding to the active subscriber identity has negotiated a roaming agreement), and thereby obtain cellular service at its location.

If the selected network connectivity option is to power off or down the cellular radio (e.g., to enter airplane mode), the UE may power off or down the cellular radio. If the selected network connectivity option is to deactivate the active subscriber identity and operate without an active subscriber identity, the UE may send a command to the SIM or eSIM to power down or deactivate the active subscriber identity, or may otherwise operate without an active subscriber identity. In either case, the UE may not be able to obtain cellular service while operating in this manner.

If the selected network connectivity option is to obtain a new subscriber identity, configuring the UE according to the selected option may include several steps. For example, after receiving user input indicating that the user wishes to obtain a new subscriber identity, the UE may provide an indication (or multiple indications) of one or more carriers and/or service plans available in the location via the user interface. For example, the UE might store a list of carriers and/or service plans available in various locations. Alternatively, or in addition, the UE might obtain such a list (or an update to such a list) via wireless communication. For example, the UE might be able to receive such a list (or list update) from a local carrier via a cellular base station, or via a Wi-Fi access point (e.g., in an airport or train station). Note that in some circumstances, the local carrier may provide such a list to the UE via special permitted/temporary access or publicly accessible beacon-type communication even if the UE isn't permitted to register and obtain local or roaming access to the local carrier's network, e.g., in order to facilitate over-the-air purchase and provision of local subscriber identities (either from that particular local carrier or from another local carrier) in the location.

Note that carrier/service plan selection may be performed via a single indication (e.g., list) and user input, or via multiple indications (e.g., lists) and user inputs, depending on the implementation, as desired (which may depend on a number of carriers/plans available). For example, all available carriers and plans provided by those carriers may be indicated in a single list (or other indication). Alternatively, one or more broad initial indications (e.g., carrier lists, types of service plans (e.g., pre-paid/post-paid, low-usage/medium-usage/high-usage, extent of services provided), expected duration/length of stay, etc.) followed by one or more narrowed indications (e.g., a more limited list of carriers/service plans based on one or more initial selections) may be utilized to obtain the user's selection of a carrier and service plan.

For example, as one possibility, an initial list of carriers expected to be present in a location (e.g., a country, based on MCC) might be stored in the UE, and presented via the user interface. Once a carrier has been selected via the user interface, the UE might communicate with the selected carrier via a base station operated as part of that carrier's network to obtain information regarding available service plans, which might then be presented via the user interface. In other words, a combination of using a stored carrier list to enable the user to select a carrier, followed by obtaining more detailed (and possibly more up-to-date) service plan information from the selected carrier, may be implemented if desired. Other ways of presenting carrier/service plan options to the user of the UE and/or selecting a carrier/service plan options are also possible.

Once a carrier/service plan has been selected, the UE may request the selected service plan. The UE may request the selected service plan from the carrier directly (e.g., via a base station operated by the carrier and coupled to the carrier's core network), or indirectly (e.g., via a base station operated by another carrier, which may require a temporary or limited mutual-use agreement or other agreement between carriers, via a Wi-Fi access point/ISP connected to the Internet, or via another network).

In turn, the carrier may provide (e.g., again directly or indirectly) subscriber identity information (e.g., information for obtaining service from the carrier) in response to the request for the selected service plan. The subscriber identity information may include a partial or complete subscriber identity. For example, a temporary subscriber identity (e.g., a temporary mobile subscriber identity, "TMSI") enabling authentication and limited access (e.g., for performing authenticated payment for the selected service plan) may be provided initially. Access limits could be removed and/or any remaining subscriber identity information required to complete the subscriber identity could then be provided once payment for the selected service plan were configured. Alternatively, a complete subscriber identity could be provided immediately, e.g., if an alternate payment method is in place (e.g., through a reciprocal use agreement or other special arrangement with another carrier associated with the UE, such as a carrier corresponding to another subscriber identity of the UE) or if the subscriber identity is being provided free-of-charge (e.g., on a trial or promotional basis).

Payment for the newly obtained subscriber identity, if required, may be performed in any of a variety of ways. As one possibility, payment may be pre-configured or pre-approved via special arrangements between the selected carrier and another carrier (e.g., the user's home service provider). For example, payment for the newly obtained subscriber identity may be billed to the user's home service provider, who may in turn bill the user in addition to any charges for their normal service.

As another option, the user may enter their credit card or other payment information directly via the user interface for (e.g., secure) transmission to the selected carrier, or may authorize the UE to (e.g., securely) transmit stored credit card or other payment information to the selected carrier, or the UE may automatically (e.g., securely) transmit stored credit card or other payment information to the selected carrier based on previous authorization by the user to do so and based on the user's selection of the selected carrier and service plan.

Alternatively, payment may be processed by another third party, and/or may require another form of user confirmation (e.g., by entering a username/password). For example, payment for the selected plan may be provided to the selected carrier via an account with iTunes™, Amazon™, PayPal™, or another third party payment processor using payment (e.g., credit card) information stored by the third party payment processor. Such payment may be automatic (e.g., if username/password for the third party account are stored by the UE) or may require further confirmation (e.g., if username/password for the third party account are not stored by the UE, or if the third party requests confirmation that the payment is authorized via a confirmation code or other means). Any of a variety of other means of configuring payment for the selected service plan from the selected carrier may also or alternatively be used, if desired.

Note that if desired, if the selected subscriber identity option is to obtain a new subscriber identity, the UE may alternatively be configured to obtain the new subscriber identity without further user input. For example, if the active subscriber identity (or another subscriber identity already on the UE) corresponds to a carrier with a special agreement with a carrier which provides local service in the location, the UE could be configured to automatically obtain a subscriber identity from the local carrier according to the special agreement. Such an agreement (or multiple such agreements) could provide a way for the UE to obtain service in a variety of locations without requiring the UE's service provider to pre-arrange roaming agreements with other network operators. Such an arrangement may effectively provide a form of "just-in-time" roaming provision on a per-user basis, with potentially lower cost both for the user and for the user's home carrier than if roaming agreements were to be pre-arranged (and possibly paid for) between the carriers in advance.

Alternatively, special arrangements between carriers (e.g., a user's home carrier and one or more local carriers) may be highlighted or otherwise indicated when providing an indication of possible carrier/service plan options, even if a service plan according to that carrier is not automatically selected in response to user input to obtain a new subscriber identity.

Once the new subscriber identity has been obtained, the new subscriber identity may be activated. Similar to activating any other alternate subscriber identities stored on the UE, activating the new subscriber identity might include sending a command to the SIM (e.g., the eSIM) to activate/load the new subscriber identity. Once the new subscriber identity has been activated (e.g., has become the active subscriber identity), the UE may register (e.g., via cellular communication with a base station) with a local service provider (e.g., the service provider corresponding to the new subscriber identity, or a service provider with which the service provider corresponding to the new subscriber identity has negotiated a roaming agreement), and thereby obtain cellular service at its location.

Note that some or all of the above-described steps, or variations thereof, may be performed multiple times, if desired. For example, at a later time, the UE may detect that it is in a new location, and provide an indication of new (or possibly the same) subscriber identity options at the later time in response to detecting that it is in a new location. The UE may then configure itself according to a selected subscriber identity option according to new user input received via the user interface, which may (or may not) include obtaining and/or activating a different subscriber identity and registering with a new network using the different subscriber identity.

Thus, the UE may manage subscriber identity options, e.g., based on location and user input, in order to provide the user with cellular service according to the user's preference in numerous locations. In particular, by leveraging the potential for over-the-air provisioning and re-configuration of an eSIM in combination with location-based subscriber identity management, the UE may advantageously be able to obtain cellular service in a greater variety of locations, at a lower cost, and/or with greater flexibility than with a pre-configured SIM.

Figure 6:
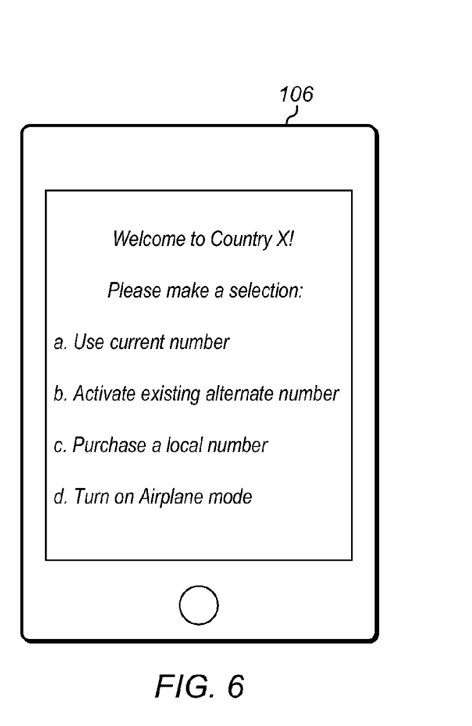
FIG. 6 illustrates a user equipment device providing an exemplary indication of subscriber identity options.
Figure 7:
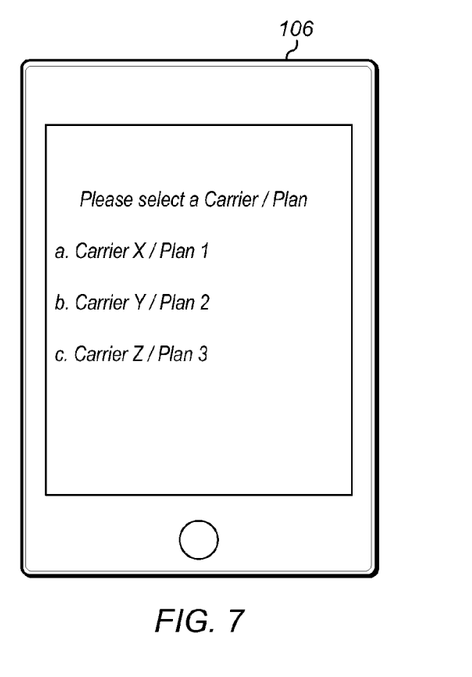
FIG. 7 illustrates a user equipment device providing an exemplary indication of carrier/plan options.

FIGS. 6-7—Exemplary User Interface Menus

FIGS. 6-7 illustrate exemplary user interface menus which may be provided on a display of a UE 106. It should be noted that the exemplary user interface menus illustrated in FIGS. 6-7 are provided by way of example of possible ways of providing indications of possible subscriber identity related options available to a user of the UE 106 (e.g., in conjunction with the method of FIG. 5), and are not intended to be limiting to the disclosure as a whole. As will be recognized by those skilled in the art, numerous alternate user interface mechanisms/elements and ways of providing indications of available options via those user interface mechanisms/elements are also possible and should be considered within the scope of the present disclosure.

The user interface menu illustrated in FIG. 6 may indicate subscriber identity options available to the UE 106, which may be selected to be indicated specifically based on a detected location of the UE 106. For example, the UE might detect that the UE is in a certain country ("Country X"), e.g., using a GPS location fix, a Wi-Fi assisted location fix, or a cell tower assisted location fix.

Based on the location of the UE 106, then, certain options for operating the UE 106 in that location may be provided via the user interface. For example, as shown, the UE 106 may provide options for using the current number (e.g., the currently active subscriber identity on the SIM) of the UE 106, for activating an existing alternate number (e.g., an alternate subscriber identity already stored on the SIM) of the UE 106, for purchasing a local number (e.g., a new subscriber identity which may be obtained, possibly over-the-air, from a local service provider), for turning on airplane mode (e.g., powering off the cellular radio of the UE 106).

Note that while the illustrated user interface menu represents one possible appearance of a user interface menu for providing subscriber identity options in a location, any number of variations or alternatives are also possible. For example, the user interface menu might also provide indications of whether the current number and any existing alternate numbers would be local to the current location of the UE 106, or roaming service (or any service) would be available using the current number and any existing alternate numbers. For example, the user interface menu might display options by which local service may be obtained as highlighted, or in boldface or italics, or with an asterisk, or with a "local" label, or in any other desired way. Similar variations may be used to denote options by which roaming service may be obtained, or by which no service may be obtained, if desired.

Once an option has been selected via the user interface (for example, by receiving user input on a touch screen of the UE 106 at a location on the touch screen corresponding to where the selected option is displayed on the touch screen, or by any other means), the UE 106 may implement the selected option. Note, though, that in some scenarios further options may be available based on the selected option. For example, if the user chooses to purchase a local number, options may be provided for carriers and service plans by which the local number may be provided, such as illustrated in the exemplary user interface menu of FIG. 7.

As shown, one or more carriers (e.g., "Carrier X", "Carrier Y", "Carrier Z"), each of which may provide one or more service plans (e.g., "Plan 1", "Plan 2", "Plan 3"), may be available in the location. The user may thus select one of the available options in order to proceed in the selection process.

Note that it is also possible that one or more subsequent user interface menus may also be provided, e.g., for selecting further details of a desired service plan, for selecting a payment option to purchase the desired service plan from the selected carrier, for providing details relating to the selected payment option, and/or for any of a variety of other reasons, as desired.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE), a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A wireless user equipment (UE) device, the UE comprising:
   a radio, comprising one or more antennas for performing wireless communication;
   a display;
   a processing element operatively coupled to the radio and the display, wherein the processing element is configured to:
   determine a location of the UE;
   provide an indication of a plurality of network connectivity options via a user interface that is displayed on the display, wherein the plurality of network connectivity options are provided based on the location of the UE, and wherein the plurality of network connectivity options comprise two or more of:
   using a first subscriber identity that is the active subscriber identity for the UE; and
   purchasing and obtaining a second subscriber identity via a wireless link, wherein, in response to selection of purchasing and obtaining the second subscriber identity, the UE is configured to automatically provide payment information stored by the UE to purchase the second subscriber identity;
   receive input selecting a network connectivity option from the plurality of network connectivity options via the user interface; and
   configure the UE according to the network connectivity identity option in response to the input.

2. The UE of claim 1, wherein receiving input comprises selecting purchasing and obtaining the second subscriber identity via the wireless link, wherein the processing element is further configured to:
   provide an indication of one or more subscriber identity provider options via the user interface;
   receive input selecting the second subscriber identity provider via the user interface;
   receive the second subscriber identity from the selected subscriber identity provider via the wireless link; and
   configure the UE to use the second subscriber identity as the active subscriber identity.

3. The UE of claim 1, wherein receiving input comprises selecting purchasing and obtaining the second subscriber identity via the wireless link, wherein the processing element is further configured to:
   provide an indication of one or more subscription plan options available from the subscriber identity provider via the user interface; and
   receive input selecting a subscription plan option via the user interface.

4. The UE of claim 1, wherein receiving input comprises selecting purchasing and obtaining the second subscriber identity via the wireless link, wherein the processing element is further configured to:
   provide an indication of one or more purchase options for the second subscriber identity via the user interface;
   receive input selecting a purchase option for the second subscriber identity via the user interface; and
   configure payment for the second subscriber identity to the selected subscriber identity provider according to the selected purchase option via the wireless link.

5. The UE of claim 1, wherein the processing element is further configured to:
   determine that an active subscriber identity is not local to the location of the UE,
   wherein the plurality of network connectivity options are provided also based on determining that the active subscriber identity is not local to the location of the UE.

6. The UE of claim 1, wherein the plurality of network connectivity options further comprise one or more of:

activating an alternate subscriber identity stored on the UE; and operating in an airplane mode.

7. The UE of claim 1, wherein the plurality of network connectivity options further comprise an alternate subscriber identity is local to the location of the UE.

8. The UE of claim 1,
wherein the processing element is configured to determine the location of the UE via one or more wireless communication technologies.

9. The UE of claim 8, wherein the one or more wireless communication technologies comprise one or more of:
one or more cellular wireless technologies;
one or more global navigational satellite systems; or
one or more versions of IEEE 802.11.

10. The UE of claim 1,
wherein the UE comprises an embedded subscriber identity module (eSIM), wherein configuring the UE according to the selected network connectivity option comprises provisioning the eSIM according to a selected subscriber identity.

11. The UE of claim 1, wherein to configure the UE according to the selected network connectivity option, the processing element is further configured to:
configure the UE to use a selected subscriber identity; and
register with a network using the selected subscriber identity, wherein said registering is performed using cellular wireless communication.

12. A method for selecting a subscriber identity based on location for a wireless user equipment (UE) device, the method comprising:
determining a location of the UE;
determining that an active subscriber identity of the UE is not local to the location of the UE;
providing an indication of a plurality of options for operating the UE in the location via a user interface, wherein the plurality of options are provided based on determining that the active subscriber identity of the UE is not local to the location of the UE, wherein the plurality of options comprise using the active subscriber identity and purchasing and obtaining a second subscriber identity via a wireless link;
receiving input selecting the option to purchase and obtain the second subscriber identity;
purchasing and obtaining the second subscriber identity via the wireless link based on the input, wherein said purchasing and obtaining the second subscriber identity comprises automatically providing payment information stored by the UE to purchase the second subscriber identity; and
operating the UE using the second subscriber identity.

13. The method of claim 12, wherein the plurality of options comprise one or more of:
operating the UE using a subscriber identity which is local to the location, wherein the subscriber identity which is local to the location is stored on the UE; or
operating the UE without an active subscriber identity.

14. The method of claim 13,
wherein operating the UE using the active subscriber identity which is not local to the location comprises roaming.

15. The method of claim 12, further comprising, in response to the input selecting the option to purchase and obtain the second subscriber identity:
providing an indication of one or more service plans available in the location via the user interface;
receiving input selecting a service plan via the user interface; and
requesting the selected service plan via the wireless link.

16. The method of claim 15, the method further comprising:
receiving temporary subscriber identity information via the wireless link in response to requesting the selected service plan via the wireless link;
registering for cellular service from a cellular service provider via the wireless link using the temporary subscriber identity information, wherein the cellular service provider is a provider of the selected service plan;
configuring payment for the selected service plan via the wireless link; and
receiving permanent subscriber identity information via the wireless link in response to configuring payment.

17. The method of claim 15, the method further comprising:
receiving information identifying the one or more available service plans available at the location from a cellular service provider via the wireless link.

18. The method of claim 12, the method further comprising:
scanning for cellular signals;
identifying one or more cellular service providers available at the location based on scanning for cellular signals; and
establishing the wireless link with a cellular service provider available at the location.

19. The method of claim 12, the method further comprising:
receiving information identifying one or more cellular service providers available at the location from a cellular service provider via the wireless link.

20. The method of claim 12,
wherein the UE comprises an embedded subscriber identity module (eSIM) storing the active subscriber identity information.

21. A non-transitory computer accessible memory medium comprising program instructions for selecting subscriber identity settings based on location for a wireless user equipment (UE) device, wherein the UE comprises an embedded subscriber identity module (eSIM), wherein when executed at the UE, the program instructions cause the UE to:
determine a mobile country code (MCC) corresponding to a location of the UE;
determine that an MCC of an active subscriber identity of the eSIM does not match the MCC corresponding to the location of the UE;
provide an indication of a plurality of network connectivity options via a user interface in response to determining that the MCC of the active subscriber identity of the eSIM does not match the MCC corresponding to the location of the UE, wherein the plurality of options comprise using the active subscriber identity and purchasing and obtaining a second subscriber identity via a wireless link;
receive input selecting the option to purchase and obtain the second subscriber identity;
purchasing and obtaining the second subscriber identity via the wireless link based on the input, wherein said purchasing and obtaining the second subscriber identity comprises automatically providing payment information stored by the UE to purchase the second subscriber identity; and updating the eSIM according to use the second subscriber identity.

22. A wireless user equipment (UE) device, the UE comprising:
   a radio, comprising one or more antennas for performing cellular communication;
   a memory medium; and
   one or more processing elements configured to execute program instructions comprised on the memory medium;
   wherein the UE is configured to:
      determine that the UE is in a location for which an active subscriber identity of the UE does not provide local cellular service;
      provide a plurality of network connectivity options in response to determining that the UE is in a location for which an active subscriber identity of the UE does not provide local cellular service, wherein the plurality of network connectivity options comprise:
         using the active subscriber identity;
         activating an alternate subscriber identity stored on the UE; and
         purchasing and obtaining a subscriber identity via cellular communication and activating the purchased subscriber identity, wherein, in response to selection of purchasing and obtaining the second subscriber identity, the UE is configured to automatically provide payment information stored by the UE to purchase the subscriber identity;
      receive input selecting a network connectivity option; and
      configure the UE according to the selected network connectivity option in response to the input.

23. The UE of claim 22,
   wherein the active subscriber identity corresponds to a cellular service provider that provides roaming cellular service in the location via one or more roaming agreements between the cellular service provider and one or more cellular service providers that provide local cellular service in the location.

24. The UE of claim 22,
   wherein the alternate subscriber identity stored on the UE corresponds to a cellular service provider that provides local service in the location.

25. The UE of claim 22,
   wherein the purchased subscriber identity corresponds to a cellular service provider that provides local service in the location.

* * * * *